(12) United States Patent
Nishizaki

(10) Patent No.: US 11,558,861 B2
(45) Date of Patent: Jan. 17, 2023

(54) COMPUTER-READABLE MEDIUM, RELAY DEVICE, TERMINAL MANAGEMENT DEVICE, AND SYSTEM FOR MANAGING TERMINAL DEVICE NOT DIRECTLY COMMUNICABLE WITH TERMINAL MANAGEMENT DEVICE

(71) Applicant: BROTHER KOGYO KABUSHIKI KAISHA, Nagoya (JP)

(72) Inventor: Takashi Nishizaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 56 days.

(21) Appl. No.: 17/034,695

(22) Filed: Sep. 28, 2020

(65) Prior Publication Data

US 2021/0099993 A1    Apr. 1, 2021

(30) Foreign Application Priority Data

Sep. 30, 2019  (JP) ............................. JP2019-179487

(51) Int. Cl.
  *H04W 72/04*  (2009.01)
  *H04W 72/02*  (2009.01)
  *H04B 7/155*  (2006.01)
  *H04W 84/12*  (2009.01)

(52) U.S. Cl.
  CPC .... *H04W 72/0413* (2013.01); *H04B 7/15528* (2013.01); *H04W 72/02* (2013.01); *H04W 84/12* (2013.01)

(58) Field of Classification Search
  None
  See application file for complete search history.

(56) References Cited

U.S. PATENT DOCUMENTS

| 2015/0271359 A1* | 9/2015 | Nakai | ................ H04N 1/32662 358/1.15 |
| 2019/0082058 A1* | 3/2019 | Aoki | .................. H04N 1/32406 |

FOREIGN PATENT DOCUMENTS

| JP | 2017-536598 A | 12/2017 |
| WO | WO 2016/048417 A1 | 3/2016 |

* cited by examiner

*Primary Examiner* — Basil Ma
(74) *Attorney, Agent, or Firm* — Scully, Scott, Murphy & Presser, PC

(57) ABSTRACT

A non-transitory computer-readable medium stores computer-readable program instructions executable by a processor of a relay device via which a terminal management device is communicable with a terminal device. The program instructions are configured to, when executed by the processor, cause the relay device to transmit, to the terminal management device, an inquiry for obtainment of an instruction directed to the relay device, when receiving from the terminal management device a reply including an instruction to perform a periodic process, perform the periodic process to, each time an interval elapses, repeatedly receive the terminal information from the terminal device and transmit the received terminal information to the terminal management device even without again receiving the instruction to perform the periodic process, and when receiving from the terminal management device a reply including an instruction to change the interval, change the interval.

13 Claims, 11 Drawing Sheets

| Client ID | Action Checking Interval | Final Action Checking Date and Time | Version | ... |
|---|---|---|---|---|
| AAA | 1 min. | 2019/8/21 17:00:00 | 1.12 | ... |
| BBB | 1 min. | 2019/8/21 17:00:10 | 1.12 | ... |

FIG. 3A

| Action ID | Action Type | Periodic Flag | Action Contents |
|---|---|---|---|
| Action A | Check Status | true | Interval = 30 min. |
| Action B | Test Printing | false | — |
| Action C | Reset Check Status | false | Interval = 10 min. |
| Action D | File Installation | false | File URL = ***** |

FIG. 3B

| Device ID | Client ID | Model Name | Serial Number | Firmware Version | Parameters |
|---|---|---|---|---|---|
| 111 | AAA | AA-AAAAAA | A1A111111 | 1.12 | Print Speed = ***, ..., ..., |
| 222 | AAA | BB-BBBBBB | B2B222222 | 1.00 | Print Speed = ***, ..., ..., |
| 333 | BBB | CC-CCCCCC | C3C333333 | 1.11 | Print Speed = ***, ..., ..., |

FIG. 3C

| Client ID | Action ID |
|---|---|
| AAA | Action A |
| BBB | Action A |
| AAA | Action C |
| BBB | Action C |

FIG. 3D

| Device ID | Action ID |
|---|---|
| 111 | Action B |
| 222 | Action D |

FIG. 3E

COMPUTER-READABLE MEDIUM, RELAY DEVICE, TERMINAL MANAGEMENT DEVICE, AND SYSTEM FOR MANAGING TERMINAL DEVICE NOT DIRECTLY COMMUNICABLE WITH TERMINAL MANAGEMENT DEVICE

CROSS-REFERENCE TO RELATED APPLICATION

This application claims priority under 35 U.S.C. § 119 from Japanese Patent Application No. 2019-179487 filed on Sep. 30, 2019. The entire subject matter of the application is incorporated herein by reference.

BACKGROUND

Technical Field

Aspects of the present disclosure are related to a non-transitory computer-readable medium, a relay device, a terminal management device, and a system for managing one or more terminal devices unable to communicate directly with the terminal management device.

Related Art

A technique for managing a plurality of terminal devices by a terminal management device has been known.

SUMMARY

However, the known technology is based on an assumption that the terminal management device is configured to communicate with each of the plurality of terminal devices via a network. Therefore, for instance, when a terminal device exists on a local network such that the terminal management device is not allowed to communicate directly with the terminal device thereon, the terminal management device is unable to collect information from the terminal device at desired timing.

Aspects of the present disclosure are advantageous to provide one or more improved techniques that enable a terminal management device to manage one or more terminal devices even in such an environment that the terminal management device is unable to communicate directly with the one or more terminal device.

According to aspects of the present disclosure, a non-transitory computer-readable medium is provided, which stores computer-readable program instructions executable by a processor of a relay device via which a terminal management device is communicable with a terminal device. The program instructions are configured to, when executed by the processor, cause the relay device to transmit, to the terminal management device, an inquiry for obtainment of an instruction directed to the relay device, when receiving from the terminal management device a reply including an instruction to perform a periodic process, perform the periodic process including initially, in response to receipt of the instruction to perform the periodic process, receiving terminal information from the terminal device and transmitting the received terminal information to the terminal management device, and subsequently, each time an interval set for the periodic process elapses, repeatedly receiving the terminal information from the terminal device and transmitting the received terminal information to the terminal management device, even without again receiving the instruction to perform the periodic process, and when receiving from the terminal management device a reply including an instruction to change the interval, change the interval.

According to aspects of the present disclosure, further provided is a non-transitory computer-readable medium storing computer-readable program instructions executable by a processor of a terminal management device communicable with a terminal device via a relay device. The program instructions are configured to, when executed by the processor, cause the terminal management device to, when receiving from the relay device an inquiry for obtainment of an instruction directed to the relay device, transmit to the relay device a reply including an instruction to perform a periodic process, the relay device being configured to, when receiving the instruction to perform the periodic process, perform the periodic process including initially, in response to receipt of the instruction to perform the periodic process, receiving terminal information from the terminal device and transmitting the received terminal information to the terminal management device, and subsequently, each time an interval set for the periodic process elapses, repeatedly receiving the terminal information from the terminal device and transmitting the received terminal information to the terminal management device, even without again receiving the instruction to perform the periodic process, when the periodic process is performed by the relay device, receive the terminal information repeatedly transmitted by the relay device.

According to aspects of the present disclosure, further provided is a relay device including a communication interface configured to communicate with a terminal management device and a terminal device, the terminal management device being communicable with the terminal device via the relay device, and a controller. The controller is configured to transmit an inquiry for obtainment of an instruction directed to the relay device, to the terminal management device via the communication interface, perform a periodic process when receiving a reply including an instruction to perform the periodic process from the terminal management device via the communication interface, the periodic process including initially, in response to receipt of the instruction to perform the periodic process, receiving terminal information from the terminal device and transmitting the received terminal information to the terminal management device, and subsequently, each time an interval set for the periodic process elapses, repeatedly receiving the terminal information from the terminal device and transmitting the received terminal information to the terminal management device, even without again receiving the instruction to perform the periodic process, and change the interval when receiving a reply including an instruction to change the interval from the terminal management device via the communication interface.

According to aspects of the present disclosure, further provided is a terminal management device including a communication interface configured to communicate with a relay device and communicate with a terminal device via the relay device, and a controller. The controller is configured to, when receiving from the relay device an inquiry for obtainment of an instruction directed to the relay device, transmit a reply including an instruction to perform a periodic process to the relay device via the communication interface, the relay device being configured to, when receiving the instruction to perform the periodic process, perform the periodic process including initially, in response to receipt of the instruction to perform the periodic process, receiving terminal information from the terminal device and transmitting the received terminal information to the terminal management device, and subsequently, each time an interval set for the periodic process elapses, repeatedly receiving the terminal information from the terminal device and transmitting the received terminal information to the terminal management device, even without again receiving the instruction to perform the periodic process, and when the periodic process is performed by the relay device, receive via the communication interface the terminal information repeatedly transmitted by the relay device.

According to aspects of the present disclosure, further provided is a system including a terminal device, a terminal management device, and a relay device. The relay device includes a first communication interface configured to communicate with the terminal management device and the terminal device, the terminal management device being communicable with the terminal device via the relay device, and a first controller configured to transmit an inquiry for obtainment of an instruction directed to the relay device, to the terminal management device via the first communication interface, perform a periodic process when receiving a reply including an instruction to perform the periodic process from the terminal management device via the first communication interface, the periodic process including initially, in response to receipt of the instruction to perform the periodic process, receiving terminal information from the terminal device and transmitting the received terminal information to the terminal management device, and subsequently, each time an interval set for the periodic process elapses, repeatedly receiving the terminal information from the terminal device and transmitting the received terminal information to the terminal management device, even without again receiving the instruction to perform the periodic process, and change the interval when receiving a reply including an instruction to change the interval from the terminal management device via the first communication interface. The terminal management device includes a second communication interface configured to communicate with the relay device and communicate with the terminal device via the relay device, and a second controller configured to, when receiving from the relay device an inquiry for obtainment of an instruction directed to the relay device, transmit a reply including at least one of the instruction to perform the periodic process and the instruction to change the interval to the relay device via the second communication interface, and when the periodic process is performed by the relay device, receive via the second communication interface the terminal information repeatedly transmitted by the relay device.

BRIEF DESCRIPTION OF THE ACCOMPANYING DRAWINGS

FIG. 3A shows an example of a relay device table stored in the terminal management device in the illustrative embodiment according to one or more aspects of the present disclosure.

FIG. 3B shows an example of an action table stored in the terminal management device in the illustrative embodiment according to one or more aspects of the present disclosure.

FIG. 3C shows an example of a terminal device table stored in the terminal management device in the illustrative embodiment according to one or more aspects of the present disclosure.

FIG. 3D shows an example of a relay-action intermediate table stored in the terminal management device in the illustrative embodiment according to one or more aspects of the present disclosure.

FIG. 3E shows an example of a terminal-action intermediate table stored in the terminal management device in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Configuration of Terminal Management System

Figure 1:
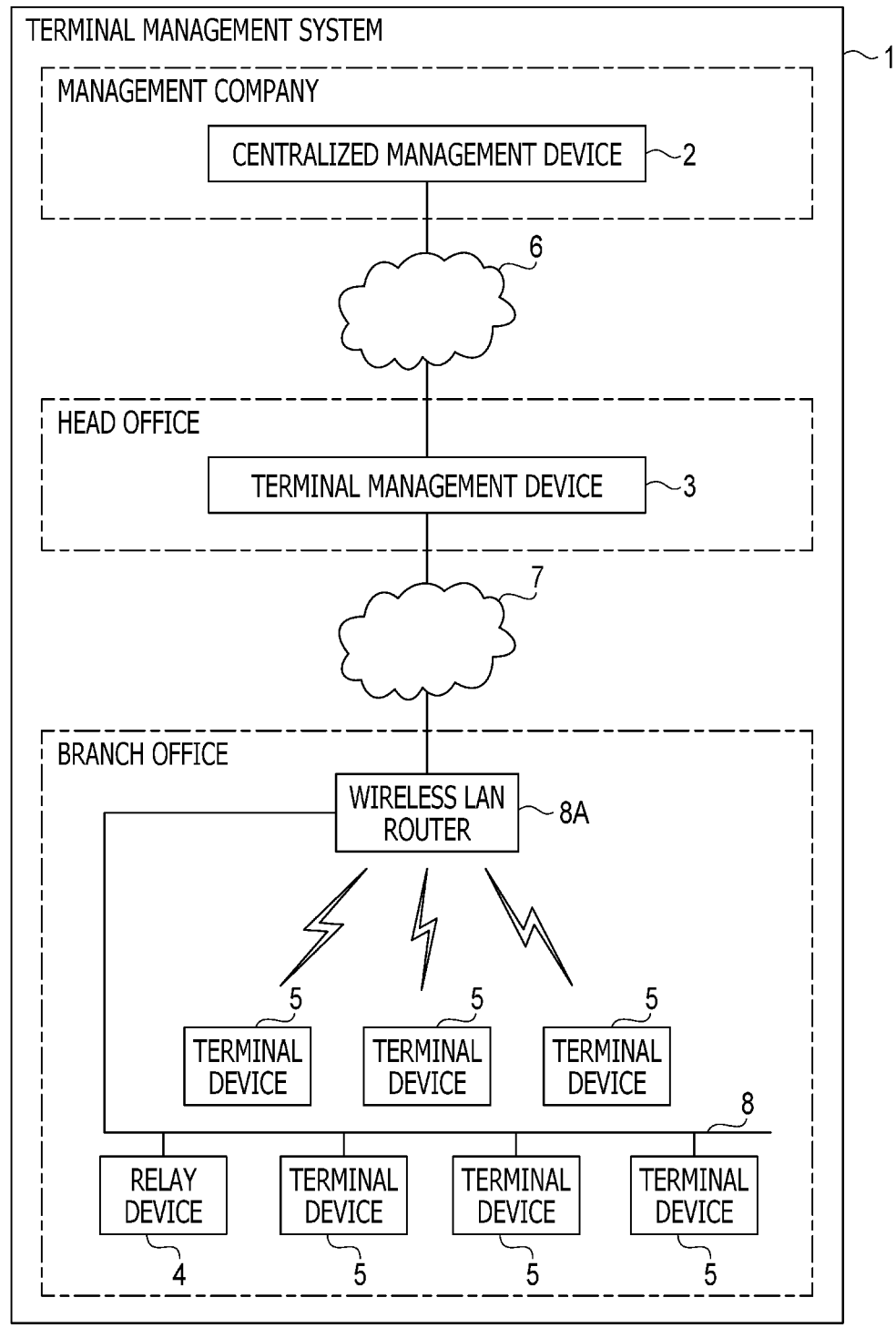
FIG. 1 is a block diagram schematically showing a configuration of a terminal management system in an illustrative embodiment according to one or more aspects of the present disclosure.

As shown in FIG. 1, a terminal management system 1 includes a centralized management device 2, a terminal management device 3, a relay device 4, and terminal devices 5. Further, as shown in FIG. 1, the centralized management device 2 and the terminal management device 3 are configured to communicate with each other via a WAN ("WAN" is an abbreviation for "Wide Area Network") 6. The terminal management device 3 and the relay device 4 are configured to communicate with each other via a WAN 7 and a LAN ("LAN" is an abbreviation for "Local Area Network") 8. The relay device 4 and the terminal devices 5 are configured to communicate with each other via the LAN 8. The WAN 6 and the WAN 7 may be the same network or may be separate networks. In the illustrative embodiment, both of the WAN 6 and the WAN 7 use the Internet.

The WAN 7 and the LAN 8 are connected with each other via a wireless LAN router 8A. The wireless LAN router 8A is a device having both a router function and a wireless LAN access point function. In addition, the wireless LAN router 8A has a firewall function and is configured to prevent unauthorized access from the side of the WAN 7 to the side of the LAN 8. The wireless LAN router 8A is connected with a LAN cable. Thereby, the LAN 8 is configured to serve as both a wired LAN and a wireless LAN.

The terminal devices 5 may include one or more terminal devices 5 connectable with the wireless LAN and one or more terminal devices 5 connectable with the wired LAN. In the illustrative embodiment, it is assumed that each of the one or more terminal devices 5 connectable with the wireless LAN is a printer (hereinafter, which may be referred to as a "mobile printer") that is used in conjunction with a mobile terminal. In this case, each terminal device 5 connectable with the wireless LAN establishes a communication link with the wireless LAN router 8A when located within a communicable range of the wireless LAN router 8A, thereby being incorporated into the terminal management system 1. Examples of the one or more terminal devices 5 connectable with the wired LAN may include, but are not limited to, printers and MFPs ("MFP" is an abbreviation for "Multi-Function Peripheral") that are incompatible with the wireless LAN.

For instance, in the terminal management system 1 of the illustrative embodiment, the centralized management device 2 may collect information from the terminal devices 5, and may remotely control the terminal devices 5 to perform processes such as test printing, rebooting, and shutting down. Examples of a location where each device included in the terminal management system 1 is installed may include, but are not limited to, a case in which the terminal management device 3 is installed at a head office of Company A, and the relay device 4 and the terminal devices 5 are installed at a branch office of Company A.

In this case, information (hereinafter, which may be referred to as "terminal information") regarding each of the plurality of terminal devices 5 operated at the branch office of Company A is collected by the terminal management device 3 installed at the head office of Company A. The terminal information collected by the terminal management device 3 is collected and managed by the centralized management device 2, for instance, which is operated by a management company different from Company A. However, the centralized management device 2 may be operated by Company A. Thus, it is arbitrary whether or not Company A and the management company are separate companies.

Although the following features are not shown in FIG. 1, there may be one or more terminal management devices 3 other than the aforementioned terminal management device 3. Namely, the terminal management system 1 may include a plurality of terminal management devices 3. In this case, the plurality of terminal management devices 3 may be configured to be managed by the single centralized management device 2. For instance, a terminal management device 3 may be installed in each of Companies B, C, D, . . . different from Company A, and those plurality of terminal management devices 3 may be managed by the single centralized management device 2 installed in the management company.

Further, although the following features are not shown in FIG. 1, there may be one or more relay devices 4 other than the aforementioned relay device 4. Namely, the terminal management system 1 may include a plurality of relay devices 4. In this case, the plurality of relay devices 4 may be configured to be managed by the single terminal management device 3. For instance, when Company A has a plurality of branch offices, a relay device 4 may be installed at each of the branch offices, and those plurality of relay devices 4 may be managed by the single terminal management device 3 installed at the head office.

Figure 2A:
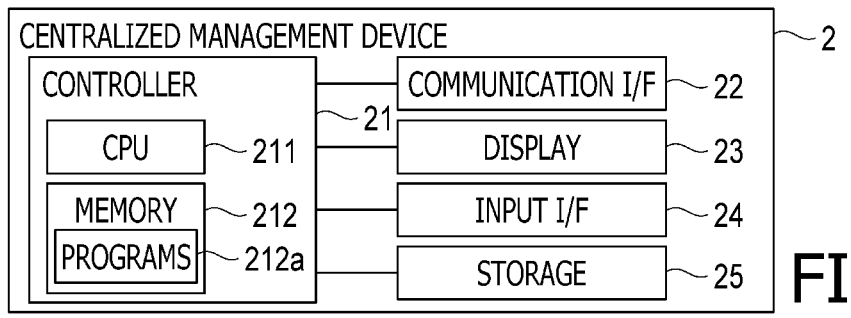
FIG. 2A is a block diagram schematically showing a configuration of a centralized management device included in the terminal management system in the illustrative embodiment according to one or more aspects of the present disclosure.

As shown in FIG. 2A, the centralized management device 2 includes a controller 21, a communication I/F ("I/F" is an abbreviation for "interface") 22, a display 23, an input I/F 24, and a storage 25. The controller 21 includes a CPU 211 and a memory 212. The CPU 211 performs various kinds of processing and control in accordance with software such as programs 212a stored in the memory 212, thereby realizing various functions of the centralized management device 2. However, the various functions of the centralized management device 2 are not limited to functions realized by the CPU 211 executing the software such as the programs 212a. Some or all of the various functions of the centralized management device 2 may be realized by one or more hardware elements.

The memory 212 includes one or more semiconductor memories (e.g., a ROM, a RAM, an NVRAM, and a flash memory) that are non-transitory substantive storage media.

The memory 212 stores the software (e.g., the programs 212a) and data. The communication I/F 22 includes a network interface controller configured to connect with the WAN 6 and perform communication via the WAN 6. The display 23 is a display device (e.g., a liquid crystal display or an organic EL display) and is configured to display various images. The input I/F 24 includes an input device configured to receive various input operations, and an input controller configured to process inputs from the input device. The storage 25 includes one or more auxiliary storage devices such as an HDD ("HDD" is an abbreviation for "Hard Disk Drive") and an SSD ("SSD" is an abbreviation for "Solid State Drive").

Figure 2B:
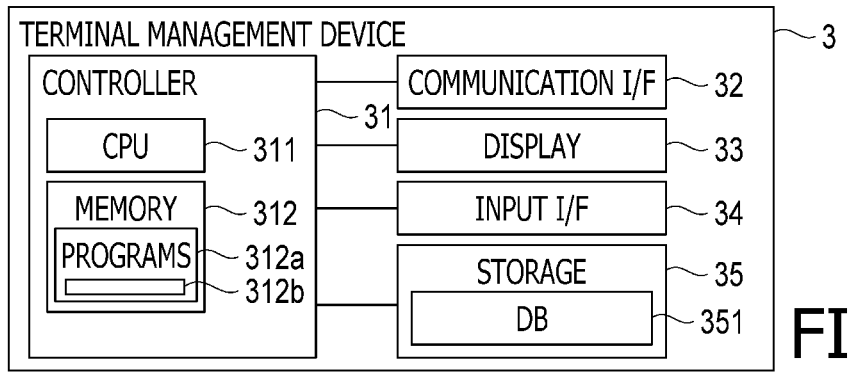
FIG. 2B is a block diagram schematically showing a configuration of a terminal management device included in the terminal management system in the illustrative embodiment according to one or more aspects of the present disclosure.

As shown in FIG. 2B, the terminal management device 3 includes a controller 31, a communication I/F 32, a display 33, an input I/F 34, and a storage 35. The controller 31 includes a CPU 31 and a memory 312. The CPU 311 performs various kinds of processing and control in accordance with software such as programs 312a stored in the memory 312, thereby realizing various functions of the terminal management device 3. However, the various functions of the terminal management device 3 are not limited to functions realized by the CPU 311 executing the software such as the programs 312a. Some or all of the various functions of the terminal management device 3 may be realized by one or more hardware elements.

The memory 312 includes one or more semiconductor memories (e.g., a ROM, a RAM, an NVRAM, and a flash memory) that are non-transitory substantive storage media. The memory 312 stores the software (e.g., the programs 312a) and data. The communication I/F 32 includes a network interface controller configured to connect with the WAN 6 and perform communication via the WAN 6. In the illustrative embodiment, the WAN 6 and the WAN 7 are the same network. Namely, the communication I/F 32 is configured to connect with the WAN 7 and perform communication via the WAN 7. The display 33 includes a display device (e.g., a liquid crystal display or an organic EL display), and is configured to display various images. The input I/F 34 includes an input device configured to receive various input operations, and an input controller configured to process inputs from the input device. The storage 35 includes one or more auxiliary storage devices such as an HDD and an SSD. The storage 35 contains a database 351 (hereinafter referred to as the "DB 351").

When the terminal management device 3 performs below-mentioned processes, various types of data are registered into the DB 351, updated, and deleted therefrom. The DB 351 contains tables stored therein such as a relay device table as shown in FIG. 3A, an action table as shown in FIG. 3B, a terminal device table as shown in FIG. 3C, a relay-action intermediate table as shown in FIG. 3D, and a terminal-action intermediate table as shown in FIG. 3E. These tables will be described in detail later.

Figure 2C:
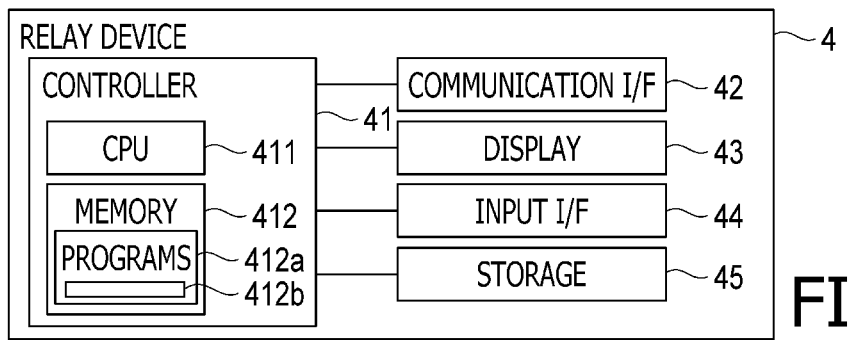
FIG. 2C is a block diagram schematically showing a configuration of a relay device included in the terminal management system in the illustrative embodiment according to one or more aspects of the present disclosure.

As shown in FIG. 2C, the relay device 4 includes a controller 41, a communication I/F 42, a display 43, an input I/F 44, and a storage 45. The controller 41 includes a CPU 411 and a memory 412. The CPU 411 performs various kinds of processing and control in accordance with software such as programs 412a stored in the memory 412, thereby realizing various functions of the relay device 4. However, the various functions of the relay device 4 are not limited to functions realized by the CPU 411 executing the software such as the programs 412a. Some or all of the various functions of the relay device 4 may be realized by one or more hardware elements.

The memory 412 includes one or more semiconductor memories (e.g., a ROM, a RAM, an NVRAM, and a flash memory) that are non-transitory substantive storage media. The memory 412 stores the software (e.g., the programs 412a) and data. The communication I/F 42 includes a network interface controller configured to connect with the WAN 7 and perform communication via the WAN 7, and a network interface controller configured to connect with the WAN 8 and perform communication via the WAN 8. The display 43 includes a display device (e.g., a liquid crystal display or an organic EL display) and is configured to display various images. The input I/F 44 includes an input device configured to receive various input operations, and an input controller configured to process inputs from the input device. The storage 45 includes one or more auxiliary storage devices such as an HDD and an SSD.

Figure 2D:
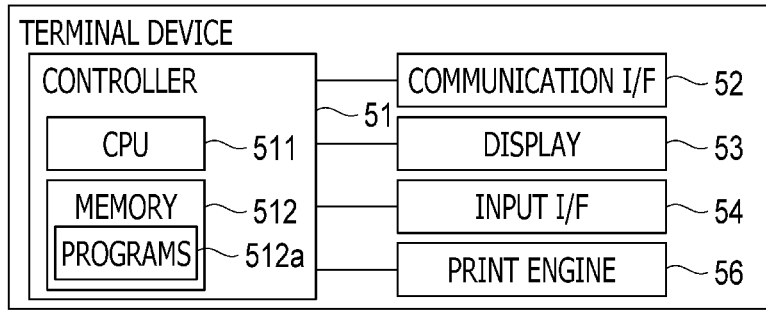
FIG. 2D is a block diagram schematically showing a configuration of a terminal device included in the terminal management system in the illustrative embodiment according to one or more aspects of the present disclosure.

As shown in FIG. 2D, each terminal device 5 includes a controller 51, a communication I/F 52, a display 53, an input I/F 54, and a print engine 56. The controller 51 includes a CPU 511 and a memory 512. The CPU 511 performs various kinds of processing and control in accordance with software such as programs 512a stored in the memory 512, thereby realizing various functions of each terminal device 5. However, the various functions of each terminal device 5 are not limited to functions realized by the CPU 511 executing the software such as the programs 512a. Some or all of the various functions of each terminal device 5 may be realized by one or more hardware elements.

The memory 512 includes one or more semiconductor memories (e.g., a ROM, a RAM, an NVRAM, and a flash memory) that are non-transitory substantive storage media. The memory 512 stores software (e.g., programs 512a) and data. The communication I/F 52 includes a network interface controller configured to connect with the LAN 8 and perform communication via the LAN 8. For instance, when one of the terminal devices 5 is a wireless LAN-compatible mobile printer, the communication I/F 52 thereof includes a network interface controller compliant with wireless LAN standards. Further, for instance, when one of the terminal devices 5 is a wired LAN-compatible printer, the communication I/F 52 thereof includes a network interface controller compliant with wired LAN standards.

The display 53 includes a display device (e.g., a liquid crystal display or an organic EL display) and is configured to display various images. The input I/F 54 includes an input device configured to receive various input operations and an input controller configured to process inputs from the input device. The print engine 56 includes a thermal printing mechanism, and is configured to perform printing on heat-sensitive roll paper. However, for instance, the print engine 56 may be configured to perform printing on cut paper. In another instance, the print engine 56 may be configured to perform printing in a known recording method (e.g., an inkjet method) other than the thermal method.

(2) Overview of Operations by Terminal Management System

In the illustrative embodiment, the terminal management system 1 operates as follows. When a relay processing program 412b is installed into a computer and executed, the relay processing program 412b causes the computer to perform processing as the relay device 4. It is noted that the relay processing program 412b may be included in the programs 412a stored in the memory 412. At the time of starting the relay processing program 412b, the relay device 4 accesses the terminal management device 3 via the WAN 7 and transmits a request for registration of the relay device 4 to the terminal management device 3. When receiving the request for registration of the relay device 4 from the relay device 4, the terminal management device 3 determines whether the relay device 4 has already been registered in the DB 351. When determining that the relay device 4 has not yet been registered in the DB 351, the terminal management device 3 registers information regarding the relay device 4 into the DB 351.

In addition, the terminal management device 3 registers, into the DB 351, action information representing that a periodic process should be performed as an action to be taken by the relay device 4. The action information is registered into the DB 351 as periodic information. The periodic information remains registered in the DB 351 without being deleted unless the periodic information is instructed to be deleted by a command transmitted from the centralized management device 2 to the terminal management device 3 or a command input by a user operation at the terminal management device 3. When the relay device 4 begins to operate, the relay device 4 performs the periodic process and periodically inquires of the terminal management device 3 whether there is an action to be taken by the relay device 4.

When action information regarding an action to be taken by the relay device 4 is registered in the DB 351, the terminal management device 3 transmits the action information to the relay device 4 as a reply to the inquiry. At the time of receiving an initial inquiry from the relay device 4, the terminal management device 3 transmits, to the relay device 4, the action information representing that the aforementioned periodic process should be performed by the relay device 4. The relay device 4 obtains the action information representing that the periodic process should be performed, and thereafter repeatedly performs the periodic process each time an interval elapses, according to a setting of the interval contained in the action information.

The relay device 4 searches for the terminal devices 5 to be managed, on the LAN 8, using SNMP ("SNMP" is an abbreviation for "Simple Network Management Protocol"). When the terminal devices 5 to be managed are found, the relay device 4 transmits a request for registration of the terminal information regarding the terminal devices 5 to the terminal management device 3. When receiving the request for registration of the terminal information, the terminal management device 3 registers the terminal information into the DB 351.

When a command transmitted from the centralized management device 2 to the terminal management device 3 or input by a user operation at the terminal management device 3 is a command to instruct a terminal device 5 to perform test printing or reboot, the terminal management device 3 registers action information corresponding to the command to the terminal device 5 into the DB 351. The action information is registered in the DB 351 as one-shot information. The one-shot information is information that is deleted from the DB 351 after a process corresponding to the one-shot information has been performed by the relay device 4 or a terminal device 5.

As described above, the relay device 4 periodically inquires of the terminal management device 3 whether there is an action to be taken by the relay device 4. When the aforementioned one-shot information is registered in the DB 351, the terminal management device 3 transmits the action information (i.e., the one-shot information) to the relay device 4 as a reply to the inquiry. The relay device 4 transmits a command to the terminal device 5 based on the action information received from the terminal management device 3. Thereby, the terminal device 5 performs a process such as test printing or rebooting. After execution of such a process by the terminal device 5, the relay device 4 transmits to the terminal management device 3 an execution result and an action deletion request that denotes completion of the action at the terminal device 5. The terminal management device 3 deletes the information corresponding to the action deletion request from the DB 351.

If the user wishes to change the interval of the periodic process to be periodically performed by the relay device 4, action information to provide an instruction to change the interval of the periodic process may be registered into the DB 351 by a command transmitted from the centralized management device 2 to the terminal management device 3 or by a command input by a user operation at the terminal management device 3. The action information is registered into the DB 351 as one-shot information.

As described above, the relay device 4 periodically inquires of the terminal management device 3 whether there is an action to be taken by the relay device 4. When the aforementioned one-shot information is registered in the DB 351, the terminal management device 3 may transmit the action information (i.e., the one-shot information) to the relay device 4 as a reply to the inquiry. The relay device 4 changes the interval of the periodic process that the relay device 4 is periodically performing, based on the action information received from the terminal management device 3. After having changed the interval, the relay device 4 transmits to the terminal management device 3 an execution result and an action deletion request that denotes completion of the action at the relay device 4. The terminal management device 3 deletes the information corresponding to the action deletion request from the DB 351. The relay device 4, which has received the action information to provide the instruction to change the interval, resumes the periodic process at the changed interval.

The tables shown in FIGS. 3A to 3E are used by the terminal management device 3 when the aforementioned process is performed. The relay device table (see FIG. 3A) is a table on which information regarding one or more relay devices 4 under the control of the terminal management device 3 is registered. In the example shown in FIG. 3A, two relay devices 4 under the control of the terminal management device 3 are registered on the relay device table in association with "AAA" and "BBB" assigned as client IDs to identify the relay devices 4, respectively. An item "Action Checking Interval" of the relay device table represents an interval for each relay device 4 accessing the terminal management device 3 to receive the action information from the terminal management device 3. In the example shown in FIG. 3A, each relay device 4 accesses the terminal management device 3 at intervals of one minute.

The action table (see FIG. 3B) is a table that associates each action ID with contents of a corresponding specific action. An item "Periodic Flag" of the action table represents a flag that indicates whether an action associated with each action ID is an action to be taken as a periodic process. An action associated with a periodic flag "true" is executed as a periodic process. An action associated with a periodic flag "false" is executed as a one-shot process. An item "Action Contents" of the action table represents contents that contain one or more parameters required to perform the corresponding action.

The terminal device table (see FIG. 3C) is a table on which the terminal information regarding the terminal devices 5 is registered. The terminal information is uploaded to the terminal management device 3 by the relay devices 4. An item "Device ID" of the terminal device table represents an ID assigned to each individual terminal device 5. An item "Client ID" of the terminal device table represents an ID assigned to a corresponding relay device 4 associated with each terminal device 5. In other words, the "Client ID" indicates which relay device 4 each terminal device 5 is under the control of.

The relay-action intermediate table (see FIG. 3D) is a table on which an action ID of an action to be taken by a relay device 4 is associated with a client ID of the relay device 4 which is instructed to take the action, for instance, by a command transmitted from the centralized management device 2 to the terminal management device 3 or a command input by a user operation at the terminal management device 3. When accessed by a relay device 4 which intends to check an action to take, the terminal management device 3 checks whether the client ID of the relay device 4 having accessed the terminal management device 3 is registered on the relay-action intermediate table. When the client ID of the relay device 4 that has accessed the terminal management device 3 is registered on the relay-action intermediate table, the terminal management device 3 generates action information with reference to the action table (see FIG. 3B), based on the action ID associated with the registered client ID, and sends the generated action information to the relay device 4 that has accessed the terminal management device 3.

The terminal-action intermediate table (see FIG. 3E) is a table on which an action ID of an action to be taken by a terminal device 5 is associated with a device ID of the terminal device 5 which is instructed to take the action, for instance, by a command transmitted from the centralized management device 2 to the terminal management device 3 or a command input by a user operation at the terminal management device 3. When accessed by a relay device 4 which intends to check an action to take, the terminal management device 3 obtains device IDs of terminal devices 5 under the control of the relay device 4 that has accessed the terminal management device 3, with reference to the terminal device table (see FIG. 3C). Subsequently, the terminal management device 3 checks whether the obtained device IDs are registered on the terminal-action intermediate table. When the obtained device IDs are registered on the terminal-action intermediate table, the terminal management device 3 generates action information with reference to the action table (see FIG. 3B), based on the action IDs associated with the obtained device IDs, and sends the generated action information to the relay device 4 that has accessed to the terminal management device 3.

(3) Processes to Be Performed by Terminal Management Device

Next, processes to be performed by the terminal management device 3 will be described. In the terminal management device 3, the CPU 311 performs processes according to a terminal management processing program 312*b* stored in the memory 312. It is noted that the terminal management processing program 312*b* may be included in the programs 312*a* stored in the memory 312. Specifically, the terminal management device 3 performs processes as shown in FIGS. 4A, 4B, 4C, and 4D.

(3.1) Information Adding Process

Figure 4A:
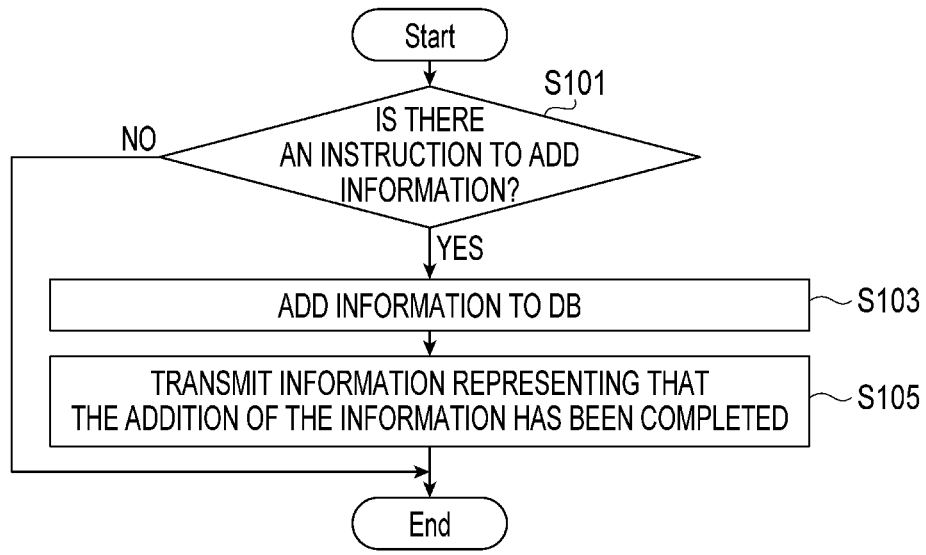
FIG. 4A is a flowchart showing a procedure of an information adding process to be performed by the terminal management device in the illustrative embodiment according to one or more aspects of the present disclosure.

When an information adding process shown in FIG. 4A is started, the terminal management device 3 determines whether there is an instruction to add information (S101). When an instruction directed to the terminal management device 3, a relay device 4, or a terminal device 5 is input by a user operation at the centralized management device 2, the centralized management device 2 transmits information representing contents of the instruction to the terminal management device 3 by using an HTTP method "POST." When making a request to the terminal management device 3 for adding terminal information, a relay device 4 transmits the terminal information to be added to the terminal management device 3 by using the HTTP method "POST."

In S101, when accessed by the centralized management device 2 or the relay device 4 by using the HTTP method "POST," the terminal management device 3 determines that there is an instruction to add information (S101: Yes) and adds information to a table in the DB 351 (S103). Subsequently, the terminal management device 3 transmits information representing that the addition of the information has been completed, to the centralized management device 2 or the relay device 4 that has transmitted the instruction (S105). After completion of S105, the terminal management device 3 terminates the information adding process shown in FIG. 4A. When determining that there is not an instruction to add information (S101: No), the terminal management device 3 terminates the information adding process shown in FIG. 4A without executing S103 or S105.

(3.2) Information Obtaining Process

Figure 4B:
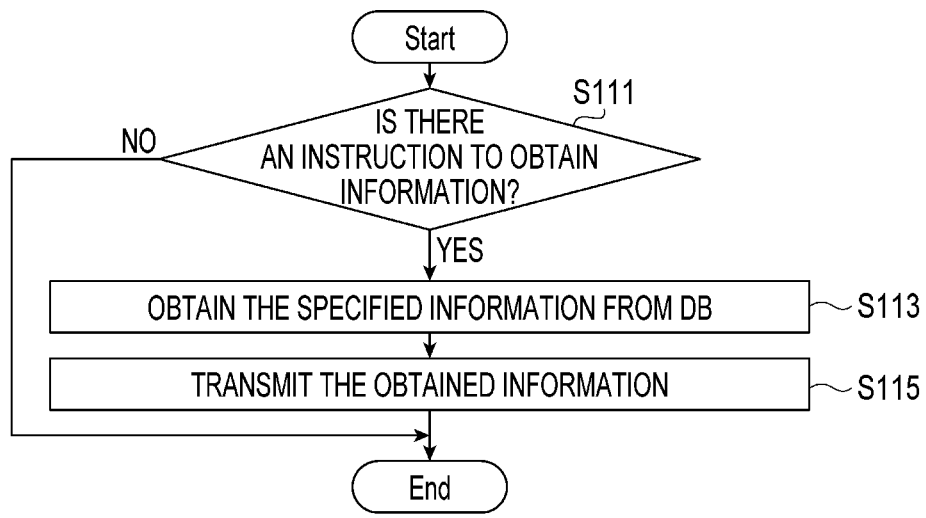
FIG. 4B is a flowchart showing a procedure of an information obtaining process to be performed by the terminal management device in the illustrative embodiment according to one or more aspects of the present disclosure.

When an information obtaining process shown in FIG. 4B is started, the terminal management device 3 determines whether there is an instruction to obtain information (S111). When an instruction to obtain terminal information from a terminal device 5 is input by a user operation at the centralized management device 2, the centralized management device 2 transmits information representing contents of the instruction to the terminal management device 3 by using an HTTP method "GET." When making a request for obtainment of action information to the terminal management device 3, a relay device 4 transmits the request to the terminal management device 3 by using the HTTP method "GET."

In S111, when accessed by the centralized management device 2 or the relay device 4 by using the HTTP method "GET," the terminal management device 3 determines that there is an instruction to obtain information (S111: Yes) and obtains the information specified by the centralized management device 2 or the relay device 4 from the DB 351 (S113). Subsequently, the terminal management device 3 transmits the obtained information to the centralized management device 2 or the relay device 4 that has transmitted the instruction (S115). After completion of S115, the terminal management device 3 terminates the information obtaining process shown in FIG. 4B. When determining in S111 that there is not an instruction to obtain information (S111: No), the terminal management device 3 terminates the information obtaining process shown in FIG. 4B without executing S113 or S115.

(3.3) Information Updating Process

Figure 4C:
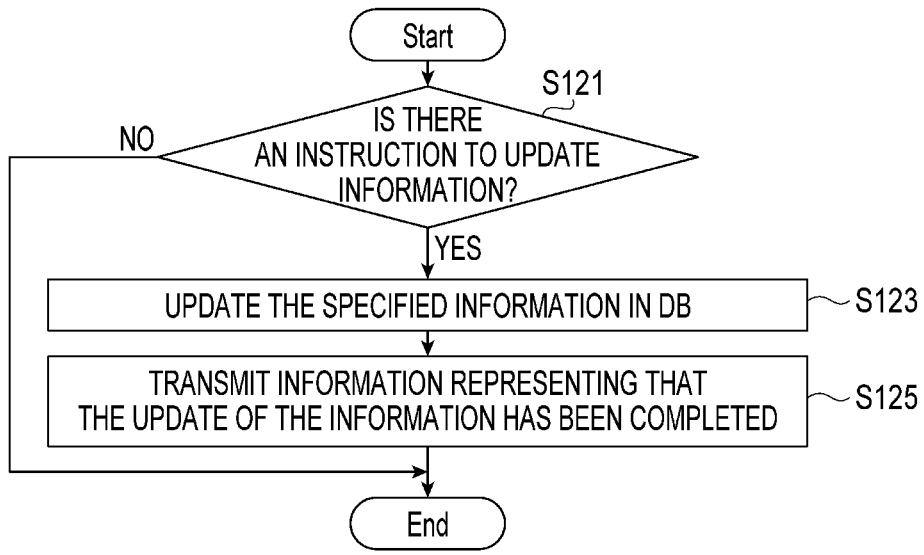
FIG. 4C is a flowchart showing a procedure of an information updating process to be performed by the terminal management device in the illustrative embodiment according to one or more aspects of the present disclosure.

When an information updating process shown in FIG. 4C is started, the terminal management device 3 determines whether there is an instruction to update information (S121). When making a request to the terminal management device 3 for updating terminal information registered in the DB 351, a relay device 4 transmits the request to the terminal management device 3 by using an HTTP method "PUT." In S121, when accessed by the relay device 4 by using the HTTP method "PUT," the terminal management device 3 determines that there is an instruction to update information (S121: Yes) and updates the specified information in the DB 351 (S123). Subsequently, the terminal management device 3 transmits information representing that the update of the information has been completed, to the relay device 4 that has transmitted the instruction (S125). After completion of S125, the terminal management device 3 terminates the information updating process shown in FIG. 4C. When determining in S121 that there is not an instruction to update information (S121: No), the terminal management device 3 terminates the information updating process shown in FIG. 4C without executing S123 or S125.

(3.4) Information Deleting Process

Figure 4D:
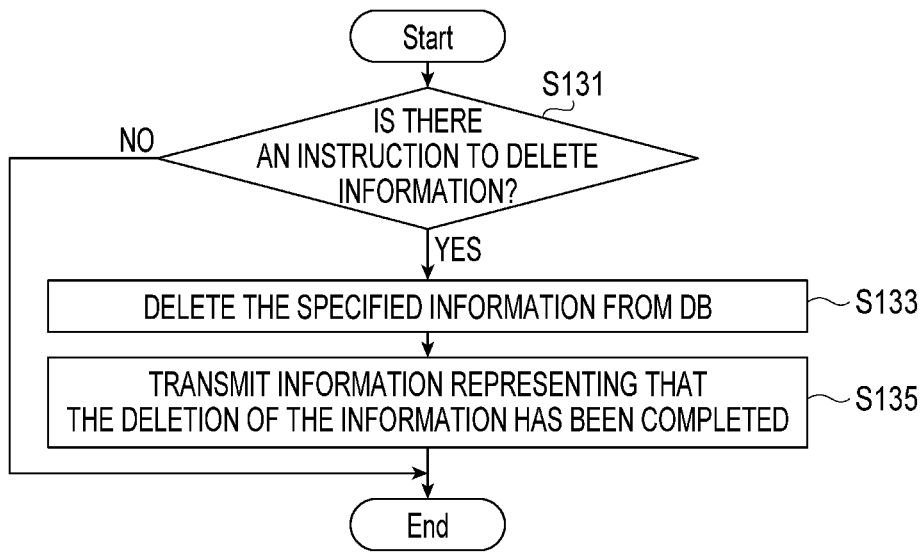
FIG. 4D is a flowchart showing a procedure of an information deleting process to be performed by the terminal management device in the illustrative embodiment according to one or more aspects of the present disclosure.

When an information deleting process shown in FIG. 4D is started, the terminal management device 3 determines whether there is an instruction to delete information (S131). When making a request to the terminal management device 3 for deleting one-shot information, a relay device 4 transmits the request to the terminal management device 3 by using an HTTP method "DELETE." In S131, when accessed by the relay device 4 by using the HTTP method "DELETE," the terminal management device 3 determines that there is an instruction to delete information (S131: Yes) and deletes the specified information from the DB 351 (S133). Subsequently, the terminal management device 3 transmits information representing that the deletion of the information has been completed, to the relay device 4 that has transmitted the instruction (S135). After completion of S135, the terminal management device 3 terminates the information deleting process shown in FIG. 4D. When determining in S131 that there is not an instruction to delete information (S131: No), the terminal management device 3 terminates the information deleting process shown in FIG. 4D without executing S133 or S135.

(4) Processes to Be Performed by Relay Device

Figure 6:
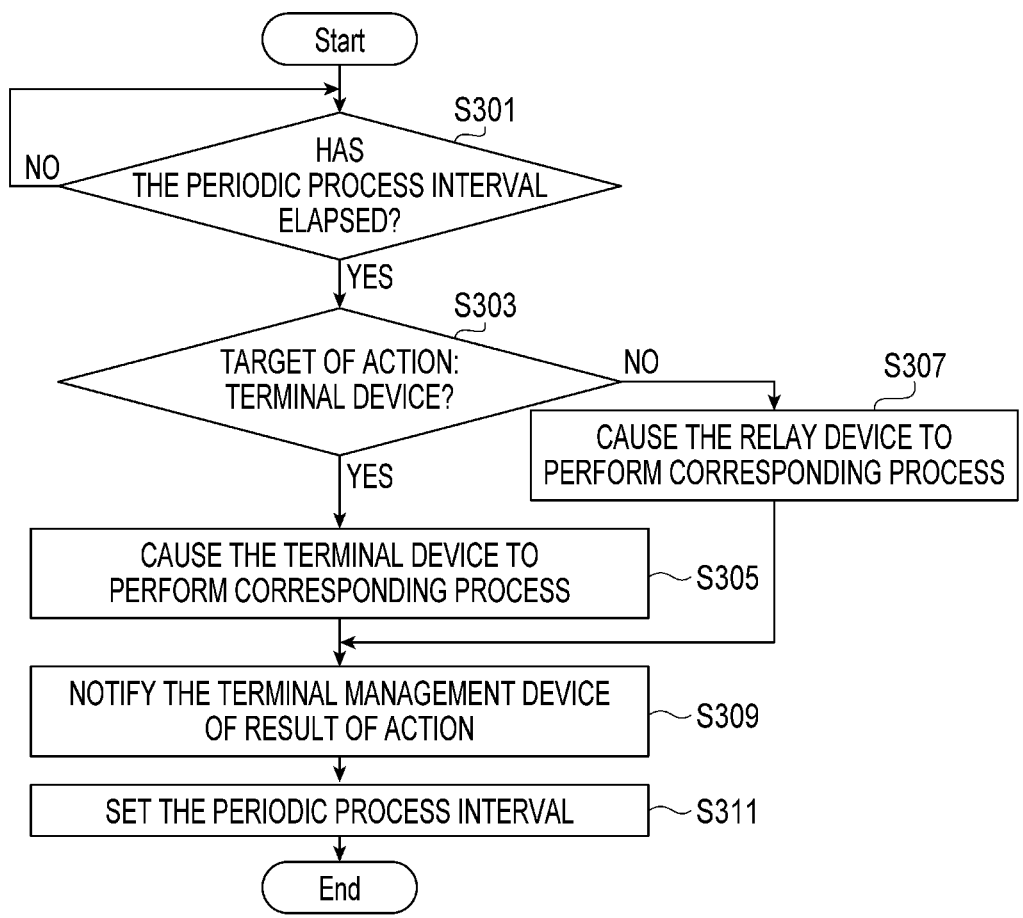
FIG. 6 is a flowchart showing a procedure of a periodic process to be performed by the relay device in the illustrative embodiment according to one or more aspects of the present disclosure.
Figure 7:
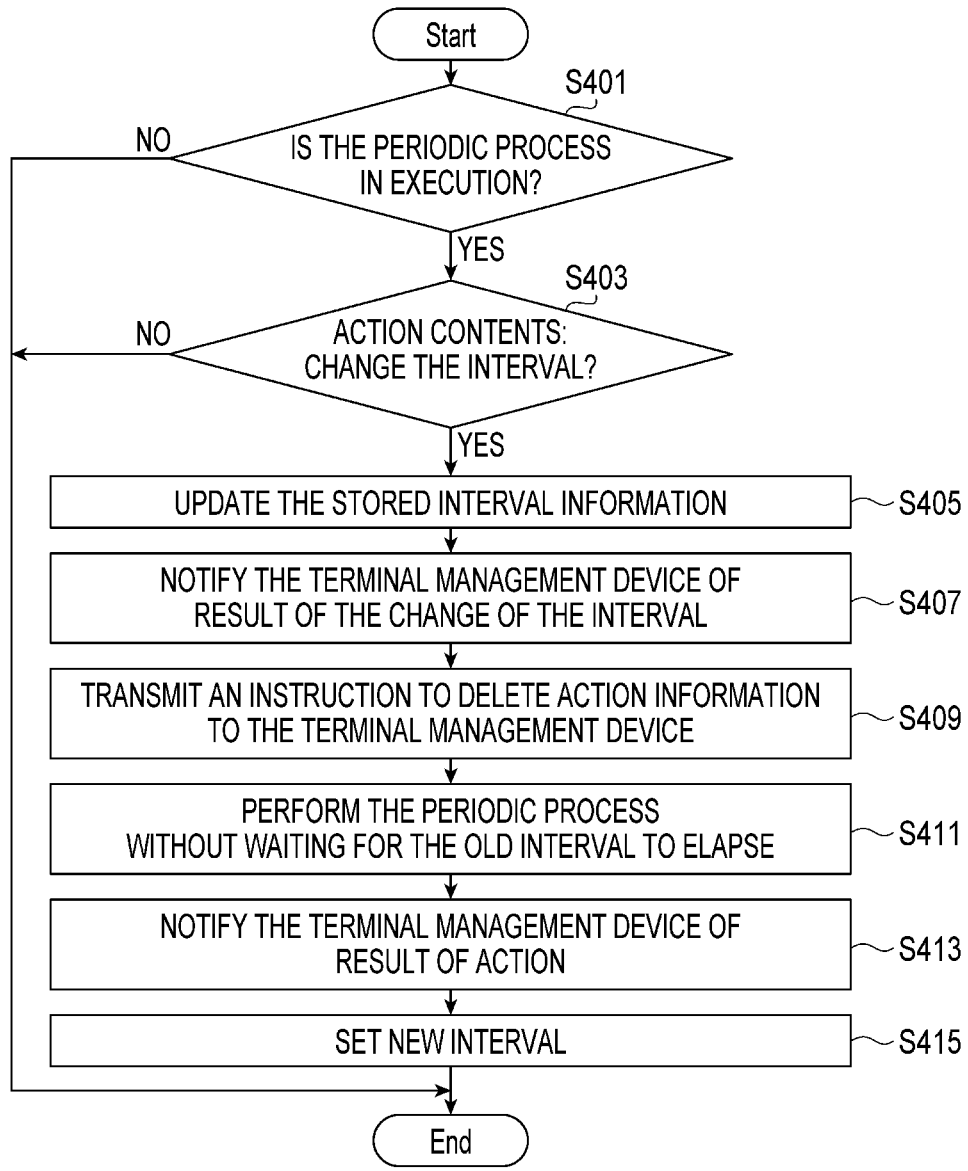
FIG. 7 is a flowchart showing a procedure of an interval changing process to be performed by the relay device in the illustrative embodiment according to one or more aspects of the present disclosure.

Next, processes to be performed by each individual relay device 4 will be described. In each relay device 4, the CPU 411 performs processes according to the relay processing program 412b stored in the memory 412. Specifically, each relay device 4 performs processes as shown in FIGS. 5, 6, and 7.

(4.1) Action Corresponding Process

Figure 5:
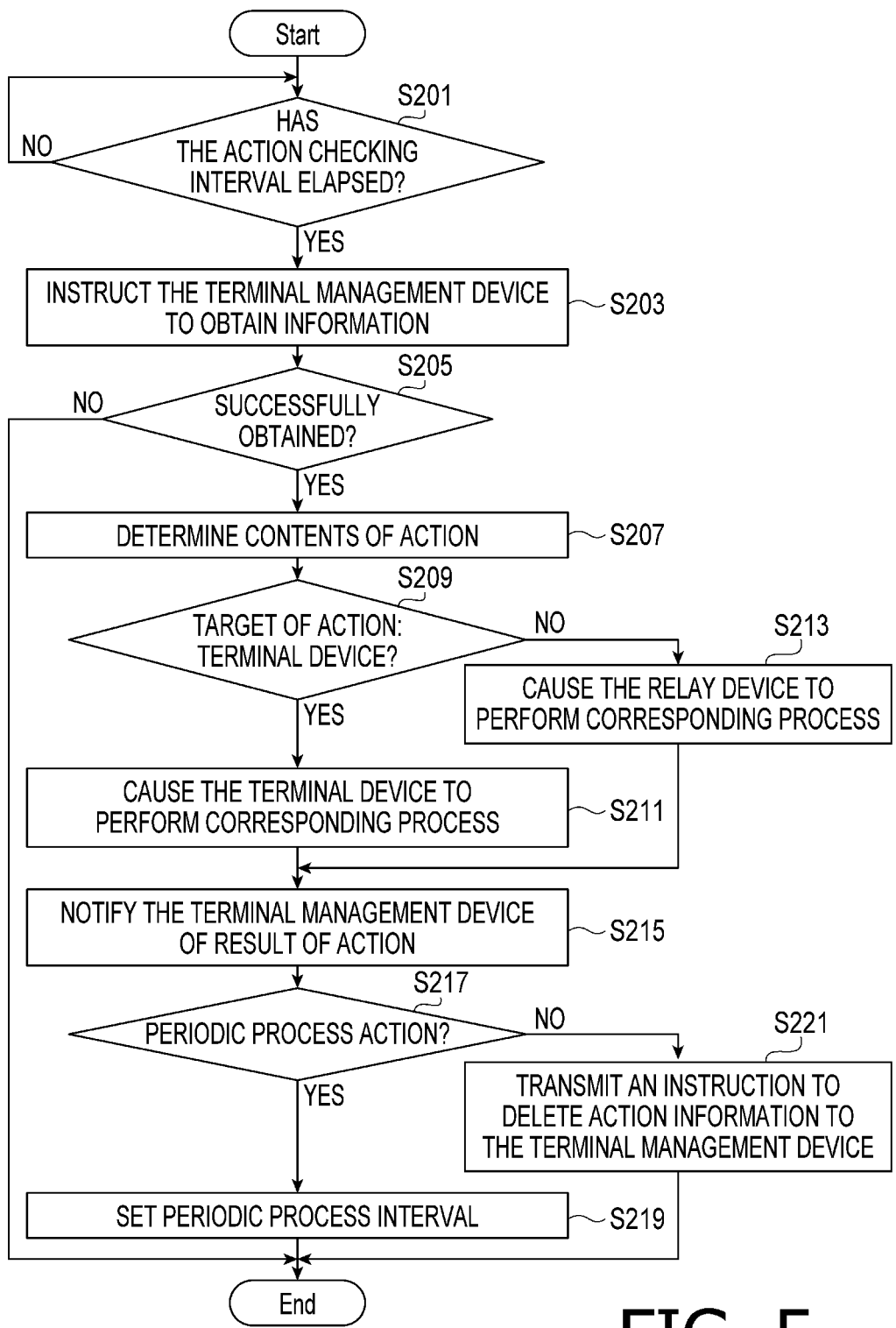
FIG. 5 is a flowchart showing a procedure of an action corresponding process to be performed by the relay device in the illustrative embodiment according to one or more aspects of the present disclosure.

When an action corresponding process shown in FIG. 5 is started, a relay device 4 determines whether the action checking interval has elapsed (S201). The action checking interval referred to in S201 is an interval between repeated processes to inquire of the terminal management device 3 whether one or more actions to be taken by the relay device 4 are registered in the DB 351 of the terminal management device 3. The one or more actions to be taken by the relay device 4 include an action to be executed by the relay device 4 and an action that the relay device 4 causes a terminal device 5 to execute.

When determining in S201 that the action checking interval has not elapsed (S201: No), the relay device 4 goes back to S201. Meanwhile, when determining in S201 that the action checking interval has elapsed (S201: Yes), the relay device 4 instructs the terminal management device 3 to obtain information (S203). In S203, the relay device 4 requests the terminal management device 3 to obtain action information by using the HTTP method "GET." At this time, the terminal management device 3 performs the information obtaining process shown in FIG. 4B.

Next, the relay device 4 determines whether the action information has been successfully obtained (S205). When determining that the action information has not been successfully obtained (S205: No), the relay device 4 terminates the action corresponding process shown in FIG. 5. For instance, when the action information is not registered in the DB 351 of the terminal management device 3, it is determined in S205 that the action information has not been successfully obtained. Meanwhile, when determining that the action information has been successfully obtained (S205: Yes), the relay device 4 determines contents of an action specified by the obtained action information (S207). Subsequently, the relay device 4 determines whether a target of the action is a terminal device 5, based on a result of the determination made in S207 (S209).

When determining in S209 that the target of the action is a terminal device 5 (209: Yes), the relay device 4 causes the terminal device 5 to perform a process corresponding to the action (S211). For instance, in S211, the terminal device 5 may be caused to perform a process such as test printing, rebooting, or shutting down. Meanwhile, when determining in S209 that the target of the action is not a terminal device 5 (209: No), the relay device 4 causes itself to perform a process corresponding to the action (S213). For instance, in S213, the relay device 4 causes itself to obtain terminal information. In the illustrative embodiment, the relay device 4 obtains terminal information as a periodic process action. After completion of S211 or S213, the relay device 4 notifies the terminal management device 3 of a result of the action (S215).

Next, the relay device 4 determines whether the action to be taken this time is a periodic process action (S217). When determining that the action to be taken this time is a periodic process action (S217: Yes), the relaying device 4 sets a periodic process interval (S219). For instance, the action information of the periodic process contains a setting such as "Interval=30 minutes." In S219, the relay device 4 sets, for a timer, the time at which the periodic process is to be next performed as the periodic process interval in accordance with the setting contained in the action information, and starts time measurement using the timer.

On the other hand, when determining in S217 that the action to be taken this time is not a periodic process action (S217: No), the relaying device 4 transmits an instruction to delete the action information to the terminal management device 3 (S221). Specifically, in S221, the relay device 4 requests the terminal management device 3 to delete the action information by using the HTTP method "DELETE." At this time, the terminal management device 3 performs the information deleting process shown in FIG. 4D. After completion of S219 or S221, the relay device 4 terminates the action corresponding process shown in FIG. 5.

(4.2) Periodic Process

When a periodic process shown in FIG. 6 is started, the relay device 4 determines whether the periodic process interval has elapsed (S301). Specifically, in S301, it is determined whether the time set in S219 is reached. When determining that the periodic process interval has not elapsed (S301: No), the relay device 4 goes back to S301. Meanwhile, when determining that the periodic process interval has elapsed (S301: Yes), the relay device 4 determines whether the target of the action is a terminal device 5 (S303).

When determining that the target of the action is a terminal device 5 (S303: Yes), the relay device 4 causes the terminal device 5 to perform a corresponding process (S305). Meanwhile, when determining that the target of the action is not a terminal device 5 (S303: No), the relay device 4 causes itself to perform a corresponding process (S307). In the illustrative embodiment, it is assumed that in the periodic process, the relay device 4 causes itself to obtain terminal information. Therefore, in S303, when determining that the target of the action is not a terminal device 5 (S303: No), the relay device 4 causes itself to obtain the terminal information (S307). However, since the periodic process shown in FIG. 6 includes the steps S 303 and S 305, the relay device 4 may cause the terminal device 5 to periodically perform some kind of process.

After completion of S305 or S307, the relay device 4 notifies the terminal management device 3 of a result of the action (S309). Subsequently, the relay device 4 sets the periodic process interval (S311). In substantially the same manner as in the aforementioned step S219, in S311, the relay device 4 sets, for the timer, the time at which the periodic process is to be next performed as the periodic process interval, and starts time measurement with the timer. After completion of S311, the relay device 4 terminates the periodic process shown in FIG. 6.

(4.3) Interval Changing Process

When an interval changing process shown in FIG. 7 is started, the relay device 4 determines whether the periodic process is in execution (S401). When determining that the periodic process is not in execution (S401: No), the relay device 4 terminates the interval changing process shown in FIG. 7. Meanwhile, when determining that the periodic process is in execution (S401: Yes), the relay device 4 determines whether the contents of the action information represent to change the interval (S403).

When determining that the contents of the action information do not represent to change the interval (S403: No), the relay device 4 terminates the interval changing process shown in FIG. 7. Meanwhile, when determining that the contents of the action information represent to change the interval (S403: Yes), the relay device 4 updates interval information stored therein (S405). For instance, when the contents of the action information represent to change the interval, the action information contains a setting such as "Interval=10 minutes." In S405, the relay device 4 updates the interval stored in the memory 412 in accordance with the setting contained in the action information.

Next, the relay device 4 notifies the terminal management device 3 of a result of the change of the interval (S407). Subsequently, the relay device 4 transmits an instruction to delete the action information to the terminal management device 3 (S409). Specifically, in S409, the relay device 4 makes a request to the terminal management device 3 for deleting the action information by using the HTTP method "DELETE." At this time, the terminal management device 3 performs the information deleting process shown in FIG. 4D.

Next, the relay device 4 performs the periodic process without waiting for the old interval to elapse (S411). Since the periodic process has been described with reference to FIG. 6, a detailed explanation thereof is omitted here. For instance, when the old interval is 30 minutes, the relay device 4 executes S411 even if 30 minutes have not passed since the last time the periodic process was performed. After completion of S411, the relay device 4 notifies the terminal management device 3 of a result of the action (S413). Then, the relay device 4 sets a new interval (S415). The new interval is the interval changed in S 405. Thus, for instance, when the old interval is 30 minutes, and the new interval is 10 minutes, the periodic process interval is changed such that the periodic process, which was performed periodically at 30-minute intervals, is performed periodically at 10-minute intervals. After completion of S 415, the relay device 4 terminates the interval changing process shown in FIG. 7.

(5) Example of Operations of Terminal Management System (5.1) Example of Operations (Part 1)

Figure 8:
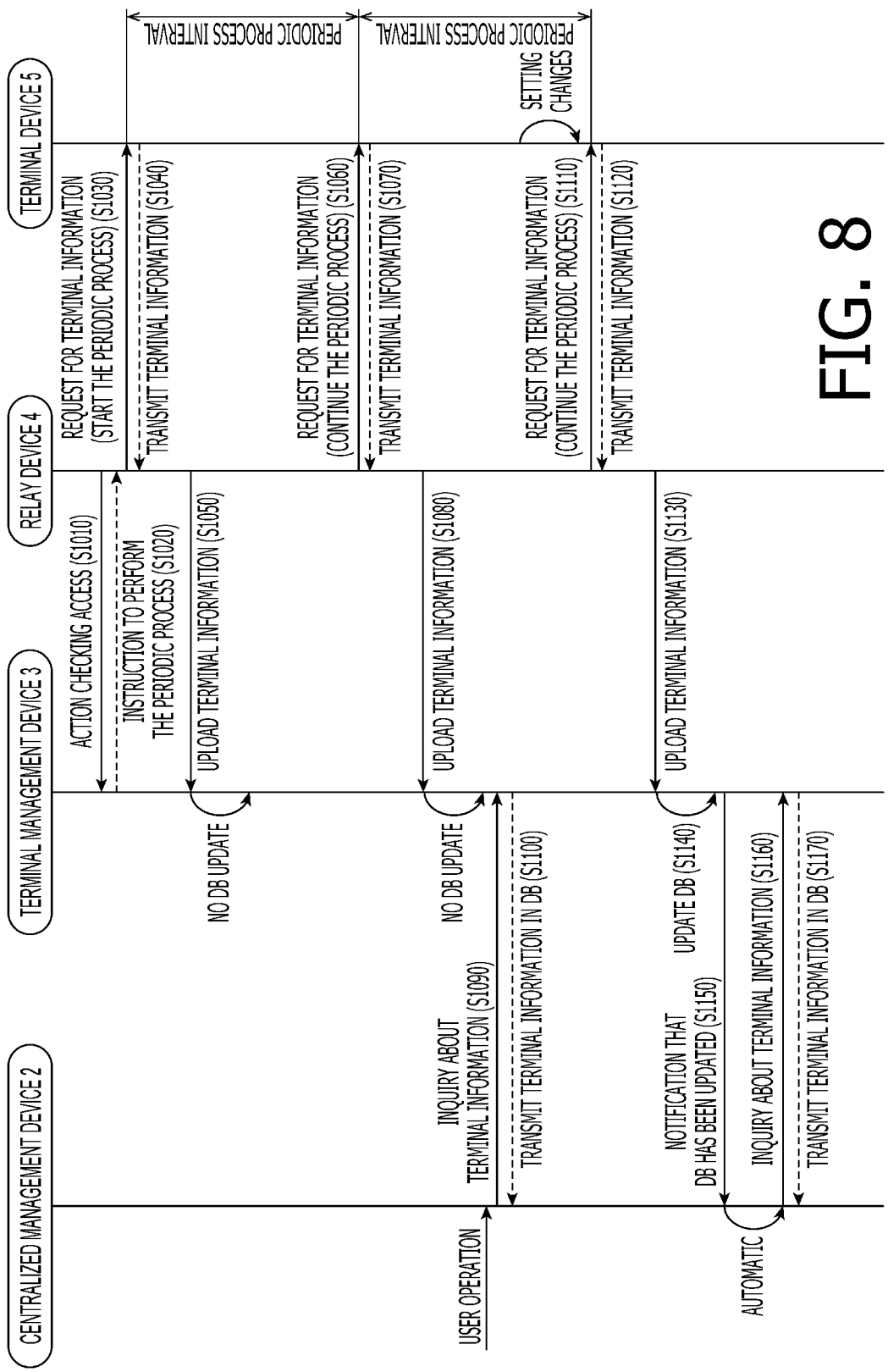
FIG. 8 shows an example of a sequence of operations in the terminal management system when the relay device performs the periodic process, in the illustrative embodiment according to one or more aspects of the present disclosure.

Next, an explanation will be provided of an example (Part 1) of operations in the terminal management system 1. FIG. 8 shows an example of a sequence of operations in the terminal management system 1 when a relay device 4 performs the periodic process. After beginning to operate, the relay device 4 makes an action checking access to the terminal management device 3 (S1010). Namely, the relay device 4 sends a request for obtainment of action information to the terminal management device 3. In reply to the request for obtainment of the action information, the terminal management device 3 transmits the action information including an instruction to perform the periodic process (S1020). The relay device 4, which has received the instruction, starts the periodic process and sends a request for terminal information to a terminal device 5 (S1030). It is noted that in S1030, the request for terminal information may be sent to one or more terminal devices 5 under the control of the relay device 4. Nonetheless, the following description will be provided about a case in which the request for terminal information is sent to a terminal device 5 under the control of the relay device 4 for the sake of simple explanation. In reply to the request for terminal information, the terminal device 5 transmits the terminal information to the relay device 4 (S1040).

When receiving the terminal information from the terminal device 5, the relay device 4 uploads the received terminal information to the terminal management device 3 (S1050). Based on the uploaded terminal information, the terminal management device 3 determines whether to update the DB 351. If there is no difference between the uploaded terminal information and the terminal information already registered in the DB 351, the DB 351 will not be updated. Then, when the periodic process interval has elapsed, the relay device 4 makes a request for the terminal information to the terminal device 5 (S1060). Namely, even if the relay device 4 does not receive an instruction to perform the periodic process from the terminal management device 3, the relay device 4 continues to perform the periodic process, and makes a request for the terminal information to the terminal device 5 after a lapse of the set interval. In reply to the request, the terminal device 5 transmits the terminal information to the relay device 4 (S1070).

When receiving the terminal information from the terminal device 5, the relay device 4 uploads the received terminal information to the terminal management device 3 (S1080). In this case as well, if there is no difference between the uploaded terminal information and the terminal information already registered in the DB 351, the DB 351 will not be updated. In this state, when an inquiry about the terminal information is sent to the terminal management device 3 in response to a user operation at the centralized management device 2 (S1090), the terminal management device 3 receives the inquiry (S1090) and transmits the terminal information in the DB 351 to the centralized management device 2 (S1100). Thereby, a user who views the terminal information on the centralized management device 2 is allowed to see the terminal information that is periodically updated in the periodic process.

Here, for instance, when any setting changes are made in the terminal device 5, the relay device 4 makes a request for the terminal information to the terminal device 5 after a lapse of the periodic process interval (S1110). In reply to the request, the terminal device 5 transmits the terminal information to the relay device 4 (S1120). When receiving the terminal information from the terminal device 5, the relay device 4 uploads the received terminal information to the terminal management device 3 (S1130). In this case, since there is a difference between the uploaded terminal information and the terminal information already registered in the DB 351, the terminal management device 3 updates the DB 351 (S1140).

When the DB 351 has been updated, the terminal management device 3 transmits to the centralized management device 2 a notification that the DB 351 has been updated (S1150). When the centralized management device 2 receives the notification, the centralized management device 2 sends an inquiry about the terminal information to the terminal management device 3 (S1160). When receiving the inquiry, the terminal management device 3 transmits the terminal information in the DB 351 to the centralized management device 2 (S1170). Thereby, the centralized management device 2 is enabled to refer to the latest terminal information reflecting the setting changes in the terminal device 5.

(5.2) Example of Operations (Part 2)

Figure 9:
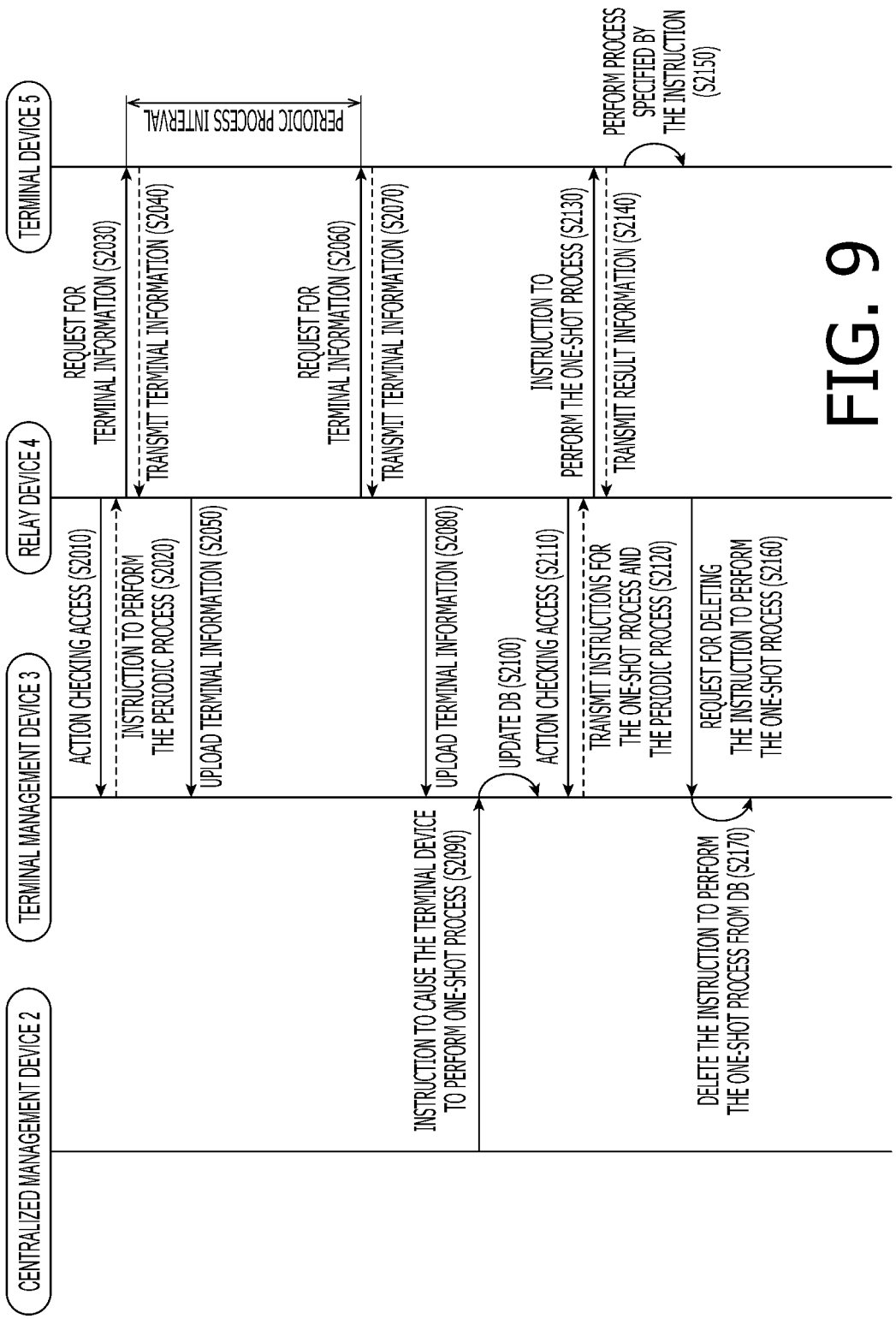
FIG. 9 shows an example of a sequence of operations in the terminal management system to cause a terminal device to perform a one-shot process, in the illustrative embodiment, according to one or more aspects of the present disclosure.

Next, an explanation will be provided of an example (Part 2) of operations in the terminal management system 1. FIG. 9 shows an example of a sequence of operations in the terminal management system 1 to cause a terminal device 5 to perform a one-shot process. After beginning to operate, the relay device 4 makes an action checking access to the terminal management device 3 (S2010). Namely, the relay device 4 sends a request for obtainment of action information to the terminal management device 3. In reply to the request for obtainment of action information, the terminal management device 3 transmits to the relay device 4 the action information including an instruction to perform a periodic process (S2020). The relay device 4, which has received the instruction to perform the periodic process, starts the periodic process and sends a request for terminal information to a terminal device 5 (S2030). It is noted that in S2030, the request for terminal information may be sent to one or more terminal devices 5 under the control of the relay device 4. Nonetheless, the following description will be provided about a case in which the request for terminal information is sent to a terminal device 5 under the control of the relay device 4 for the sake of simple explanation. In reply to the request for terminal information, the terminal device 5 transmits the terminal information to the relay device 4 (S2040).

When receiving the terminal information from the terminal device 5, the relay device 4 uploads the received terminal information to the terminal management device 3 (S2050). Then, when the periodic process interval has elapsed, the relay device 4 makes a request for the terminal information to the terminal device 5 (S2060). In reply to the request, the terminal device 5 transmits the terminal information to the relay device 4 (S2070). When receiving the terminal information from the terminal device 5, the relay device 4 uploads the received terminal information to the terminal management device 3 (S2080).

Here, for instance, when an instruction to cause the terminal device 5 to perform a one-shot process is sent to the terminal management device 3 in response to a user operation at the centralized management device 2 (S2090), the terminal management device 3 updates the DB 351 (S2100). Thereby, action information corresponding to the one-shot process is registered in the DB 351. The relay device 4 periodically makes an action checking access to the terminal management device 3, as well as performing the periodic process to send the request for the terminal information to the terminal device 5.

After the action information corresponding to the one-shot process is registered in the DB 351, when the relay device 4 makes an action checking access to the terminal management device 3 (S2110), the terminal management device 3 transmits the action information corresponding to the one-shot process to the relay device 4 (S2120). It is noted that when the relay device 4 is performing the periodic process, the action information corresponding to the periodic process is also registered in the DB 351. Therefore, when transmitting the action information corresponding to the one-shot process to the relay device 4, the terminal management device 3 also transmits the action information corresponding to the periodic process to the relay device 4. However, the relay device 4 performs the periodic process each time the periodic process interval elapses, regardless of when the relay device 4 receives the action information corresponding to the periodic process from the terminal management device 3.

When receiving the action information corresponding to the one-shot process from the terminal management device 3, the relay device 4 sends to the terminal device 5 an instruction to perform the one-shot process (S2130). The terminal device 5, which has received the instruction, transmits result information to the relay device 4 (S2140) and performs a process (e.g., test printing, rebooting, or shutting down) specified by the instruction from the relay device 4 (S2150). When receiving the result information from the terminal device 5, the relay device 4 sends to the terminal management device 3 a request for deleting the instruction to perform the one-shot process (S2160). The terminal management device 3, which has received the request, deletes from the DB 351 the action information corresponding to the one-shot process registered in the DB 351 (S2170).

(5.3) Example of Operations (Part 3)

Figure 10:
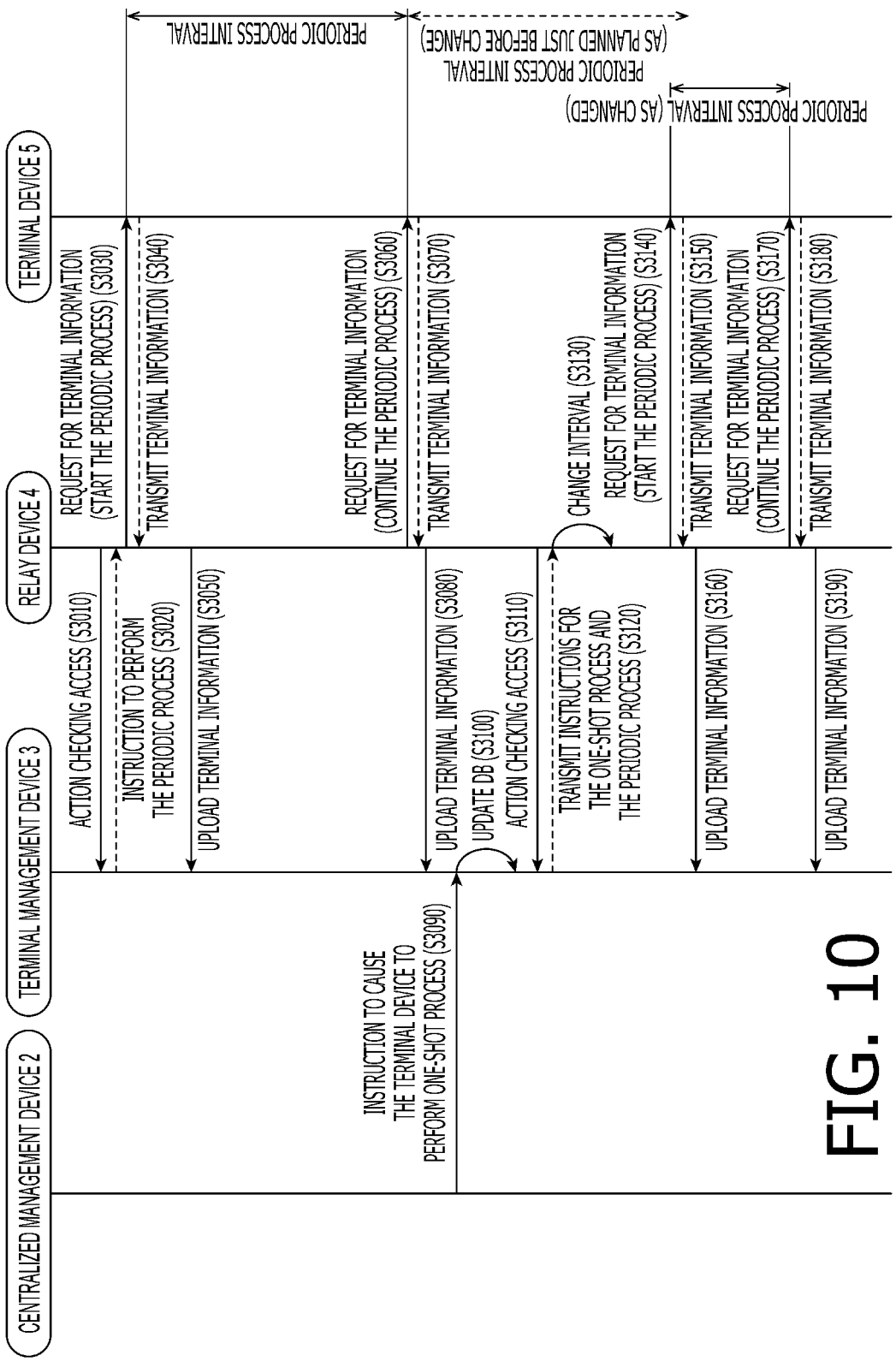
FIG. 10 shows an example of a sequence of operations in the terminal management system when the relay device performs the interval changing process, in the illustrative embodiment according to one or more aspects of the present disclosure.

Next, an explanation will be provided of an example (Part 3) of operations in the terminal management system 1. FIG. 10 shows an example of a sequence of operations in the terminal management system 1 when a relay device 4 performs the interval changing process. After beginning to operate, the relay device 4 makes an action checking access to the terminal management device 3 (S3010). Namely, the relay device 4 sends a request for obtainment of action information to the terminal management device 3. In reply to the request, the terminal management device 3 transmits to the relay device 4 the action information including an instruction to perform a periodic process (S3020). The relay device 4, which has received the instruction, starts the periodic process and sends a request for terminal information to a terminal device 5 (S3030). It is noted that in S3030, the request for terminal information may be sent to one or more terminal devices 5 under the control of the relay device 4. Nonetheless, the following description will be provided about a case in which the request for terminal information is sent to a terminal device 5 under the control of the relay device 4 for the sake of simple explanation. In reply to the request for terminal information, the terminal device 5 transmits the terminal information to the relay device 4 (S3040).

When receiving the terminal information from the terminal device 5, the relay device 4 uploads the received terminal information to the terminal management device 3 (S3050). Then, when the periodic process interval has elapsed, the relay device 4 makes a request for the terminal information to the terminal device 5 (S3060). In reply to the request for the terminal information, the terminal device 5 transmits the terminal information to the relay device 4 (S3070). When receiving the terminal information from the terminal device 5, the relay device 4 uploads the received terminal information to the terminal management device 3 (S3080).

Here, for instance, when an instruction to cause the relay device 4 to perform a one-shot process is sent to the terminal management device 3 in response to a user operation at the centralized management device 2 (S3090), the terminal management device 3 updates the DB 351 (S3100). Thereby, action information corresponding to the one-shot process is registered in the DB 351. The relay device 4 periodically makes an action checking access to the terminal management device 3, as well as performing the periodic process to send the request for the terminal information to the terminal device 5.

After the action information corresponding to the one-shot process is registered in the DB 351, when the relay device 4 makes an action checking access to the terminal management device 3 (S3110), the terminal management device 3 transmits the action information corresponding to the one-shot process to the relay device 4 (S3120). It is noted that at this time, the terminal management device 3 transmits the action information corresponding to the periodic process to the relay device 4 as described above. When receiving the action information corresponding to the one-shot process from the terminal management device 3, the relay device 4 performs the interval changing process (see FIG. 7) to change the interval of the periodic process (S3130).

At this time, the relay device 4 makes a request for the terminal information to the terminal device 5 (S3140) even when the interval before the change has not yet elapsed. In reply to the request, the terminal device 5 transmits the terminal information to the relay device 4 (S3150). When receiving the terminal information from the terminal device 5, the relay device 4 uploads the received terminal information to the terminal management device 3 (S3160). Thereafter, when the changed periodic process interval has elapsed, the relay device 4 makes a request for the terminal information to the terminal device 5 (S3170). In reply to the request, the terminal device 5 transmits the terminal information to the relay device 4 (S3180). When receiving the terminal information from the terminal device 5, the relay device 4 uploads the received terminal information to the terminal management device 3 (S3190).

(6) Advantageous Effects

According to the terminal management system 1 as described above, an individual relay device 4 may collect the terminal information from each corresponding terminal device 5 and transmit the terminal information to the terminal management device 3 repeatedly each time the interval elapses, even if the relay device does not periodically receive from the terminal management device 3 an instruction to perform the periodic process. Therefore, it is possible to reduce the number of times the terminal management device 3 sends a request to the relay device 4 and reduce a load imposed on the communication network, in comparison with such a configuration that the relay device 4 transmits the terminal information to the terminal management device 3 periodically each time the relay device 4 receives a request from the terminal management device 3.

In addition, when an instruction to change the interval is included in a response from the terminal management device 3, the relay device 4 changes the periodic processing interval. Therefore, it is possible to increase a frequency with which the relay device 4 collects the terminal information by shortening the interval and to more frequently update the terminal information to be transmitted to the terminal management device 3. Consequently, the centralized management device 2 is allowed to obtain the terminal information of a version closer to the latest state. In addition, the interval may be changed longer if it is required to decrease the frequency with which the relay device 4 collects the terminal information. Thereby, it is possible to reduce a load imposed on the LAN 8.

Moreover, in the illustrative embodiment, when the relay device 4 performs the interval changing process (see FIG. 7) to change the interval, the relay device 4 performs the periodic process without waiting for the old interval to elapse (S411). Therefore, when the interval has been changed shorter, the transmission of the terminal information is not delayed until the lapse of the longer interval before the change. Thus, it is possible to quickly put the changed interval setting into effect.

Further, in the illustrative embodiment, when the relay device 4 performs the interval changing process (see FIG. 7) to change the interval, the relay device 4 notifies the terminal management device 3 of the result of the change of the interval in S407, prior to performing the periodic process in S411. Therefore, the relay device 4 is enabled to quickly transmit result information regarding the change of the interval to the terminal management device 3 in S407 after changing the interval in S405, without waiting until the relay device 4 performs the periodic process in S411.

Further, in the illustrative embodiment, when receiving an instruction directed to the relay device 4 or a terminal device 5, the terminal management device 3 stores the received instruction into the DB 351 as action information. When receiving a request for the action information from the relay device 4, the terminal management device 3 transmits to the relay device 4 the action information stored in the DB 351 as a reply to the request. Therefore, even though a timing of receiving an instruction from a communication device or an input device that is communicable with the terminal management device 3 and a timing of receiving an inquiry from the relay device 4 are not in synchronization with each other, the terminal management device 3 may store the instruction in the DB 351 and transmit the instruction to the relay device 4. In addition, the relay device 4 makes a request for the action information to the terminal management device 3, and the terminal management device 3 transmits the action information to the relay device 4 in reply to the request. Therefore, when transmitting the action information to the relay device 4, the terminal management device 3 does not need to start accessing the relay device 4. Thus, the terminal management device 3 may transmit the action information without any problem even though the relay device 4 is inside the firewall configured by the wireless LAN router 8A.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

(7) Modifications

In the aforementioned illustrative embodiment, as described above, examples of the terminal devices 5 may include mobile printers, and printers and MFPs that are incompatible with the wireless LAN. However, the terminal devices 5 may not necessarily have a printing function. For instance, the terminal devices 5 may be PCs ("PC" is an abbreviation for "Personal Computer") or smartphones. In another instance, the terminal devices 5 may be industrial equipment or business equipment (e.g., industrial sewing machines, vending machines, business washing machines, medical equipment, etc.) configured to be remotely operated and managed via a network. In yet another instance, the terminal devices 5 may be household appliances (e.g., refrigerators, televisions, air conditioners, washing machines, etc.) configured to be remotely operated and managed via a network.

Further, in the aforementioned illustrative embodiment, the LAN 8 is configured with a combination of both the wired LAN and the wireless LAN. However, the LAN 8 may be configured with only one of the wired LAN and the wireless LAN.

Further, for instance, a plurality of functions achieved by a single element exemplified in the aforementioned illustrative embodiment may be realized by a plurality of elements. A single function achieved by a single element exemplified in the aforementioned illustrative embodiment may be realized by a plurality of elements. A plurality of functions achieved by a plurality of elements exemplified in the aforementioned illustrative embodiment may be realized by a single element. A single function achieved by a plurality of elements exemplified in the aforementioned illustrative embodiment may be realized by a single element. Some of the elements included in the configurations exemplified in the aforementioned illustrative embodiment may be omitted.

(8) Supplemental

As is apparent from the aforementioned illustrative embodiment, the relay processing program 412b, the terminal management processing program 312b, each relay device 4, the terminal management device 3, and the terminal management system 1 according to aspects of the present disclosure may further be configured as follows.

The relay processing program 412b may be configured to, when executed by the CPU 411 of a relay device 4, cause the relay device 4 to perform a periodic process in which, if the interval is changed in the interval changing process, even though the interval before the change does not elapse, the relay device 4 collects the terminal information from each corresponding terminal device 5 and transmits the collected terminal information to the terminal management device 3 at a timing when the interval is changed, and thereafter, each time the changed interval elapses, collects the terminal information from each corresponding terminal device 5 and transmits the collected terminal information to the terminal management device 3.

When the relay processing program 412b configured as above is executed by the CPU 211 of the relay device 4, the relay device 4 transmits the terminal information to the terminal management device 3 immediately after the interval is changed. Therefore, when the interval has been changed to be shorter, the transmission of the terminal information is not delayed until the lapse of the longer interval before the change. Thus, it is possible to quickly put the changed interval setting into effect.

Further, the relay processing program 412b may be configured to, when executed by the CPU 411 of a relay device 4, cause the relay device 4 to perform an interval changing process in which, after the interval has been changed, the relay device 4 transmits result information regarding a result of the change of the interval to the terminal management device 3 prior to transmitting the terminal information to the terminal management device 3 in the periodic process.

When the relay processing program 412b configured as above is executed by the CPU 211 of the relay device 4, the relay device 4 may quickly transmit the result information regarding the result of the change of the interval after the interval has been changed.

The terminal management processing program 312b may be configured to, when executed by the CPU 311, cause the terminal management device 3 to perform a storing process in which, when receiving an instruction directed to a relay device 4 or a terminal device 5 from a communication device communicable with the terminal management device 3 or through an input device capable of inputting information to the terminal management device 3, the terminal management device 3 stores the received instruction into the DB 351. Further, the terminal management processing program 312b may be configured to, when executed by the CPU 311, cause the terminal management device 3 to perform a reply process in which, when receiving from a relay device 4 an inquiry for obtainment of an instruction directed to the relay device 4, the terminal management device 3 transmits to the relay device 4 a reply including an instruction stored in the DB 351.

When the terminal management processing program 312b configured as above is executed by the CPU 311, the terminal management device 3 stores into the DB 351 an instruction directed to a relay device 4 or a terminal device 5, when receiving the instruction from the communication device or the input device. When performing the reply process, the terminal management device 3 transmits to the relay device 4 the reply including the instruction stored in the DB 351. Therefore, even though a timing of receiving the instruction from the communication device or the input device and a timing of receiving the inquiry from the relay device 4 are not in synchronization with each other, the terminal management device 3 may store the instruction in the DB 351 and transmit the instruction to the relay device 4.

In the aforementioned terminal management system 1, the terminal management device 3 and each relay devices 4 may be communicable with each other through a firewall. A relay processing method implementable on each relay device 4 in accordance with the aforementioned relay processing program 412b, a terminal management processing method implementable on the terminal management device 3 in accordance with the aforementioned terminal management processing program 312b, and a terminal management method implementable in the aforementioned terminal management system 1 are also novel and useful. In addition, a non-transitory computer-readable substantive medium storing the aforementioned relay processing program 412b and a non-transitory computer-readable substantive medium storing the aforementioned terminal management processing program 312b are also novel and useful.

The following shows examples of associations between elements exemplified in the aforementioned illustrative embodiment and modifications and elements according to aspects of the present disclosure. The terminal management system 1 may be an example of "a system" according to aspects of the present disclosure. A relay device 4 included in the terminal management system 1 may be an example of "a relay device" according to aspects of the present disclosure. A terminal device 5 under the control of the relay device 4 may be an example of "a terminal device" according to aspects of the present disclosure. The terminal management device 3 may be an example of "a terminal management device" according to aspects of the present disclosure. The CPU 411 may be an example of "a processor" of the relay device according to aspects of the present disclosure. The memory 412 storing the relay processing program 412b may be an example of "a non-transitory computer-readable medium storing computer-readable program instructions" executable by the processor of the relay device according to aspects of the present disclosure, and may also be an example of "a memory storing computer-readable program instructions" of the relay device according to aspects of the present disclosure. The communication I/F 42 may be an example of "a communication interface" of the relay device according to aspects of the present disclosure, and may also be an example of "a first communication interface" of the relay device according to aspects of the present disclosure. The controller 41 may be an example of "a controller" of the relay device according to aspects of the present disclosure, and may also be an example of "a first controller" of the relay device according to aspects of the present disclosure. The CPU 311 may be an example of "a processor" of the terminal management device according to aspects of the present disclosure. The memory 312 storing the terminal management processing program 312b may be an example of "a non-transitory computer-readable medium storing computer-readable program instructions" executable by the processor of the terminal management device according to aspects of the present disclosure. The communication I/F 32 may be an example of "a communication interface" of the terminal management device according to aspects of the present disclosure, and may also be an example of "a second communication interface" of the terminal management device according to aspects of the present disclosure. The controller 31 may be an example of "a controller" of the terminal management device according to aspects of the present disclosure, and may also be an example of "a second controller" of the terminal management device according to aspects of the present disclosure.

What is claimed is:

1. A non-transitory computer-readable medium storing computer-readable program instructions executable by a processor of a relay device via which a terminal management device is communicable with a terminal device, the program instructions being configured to, when executed by the processor, cause the relay device to:
   transmit, to the terminal management device, an inquiry for obtainment of an instruction directed to the relay device;
   when receiving from the terminal management device a reply including an instruction to perform a periodic process, perform the periodic process comprising:
      initially, in response to receipt of the instruction to perform the periodic process, receiving terminal information from the terminal device and transmitting the received terminal information to the terminal management device; and
      subsequently, each time a first interval set for the periodic process elapses, repeatedly receiving the terminal information from the terminal device and transmitting the received terminal information to the terminal management device, even without again receiving the instruction to perform the periodic process; and
   when receiving from the terminal management device a reply including an instruction to change the first interval to a second interval, after updating interval information stored in the relay device according to the second interval, transmit result information regarding a result of the change of the first interval to the terminal management device and then transmit the terminal information to the terminal management device without waiting for the first interval to elapse, before setting the second interval for the periodic process.

2. The non-transitory computer-readable medium according to claim 1,
   wherein the periodic process further comprises:
      in response to receipt of the instruction to change the first interval, receiving the terminal information from the terminal device and transmitting the received terminal information to the terminal management device even though the first interval before the change does not elapse; and
      thereafter, each time the second interval elapses, repeatedly receiving the terminal information from the terminal device and transmitting the received terminal information to the terminal management device.

3. The non-transitory computer-readable medium according to claim 1,
   wherein the terminal management device and the relay device are configured to communicate with each other through a firewall.

4. A non-transitory computer-readable medium storing computer-readable program instructions executable by a processor of a terminal management device communicable with a terminal device via a relay device, the program instructions being configured to, when executed by the processor, cause the terminal management device to:
   when receiving from the relay device an inquiry for obtainment of an instruction directed to the relay device, transmit to the relay device a reply including an instruction to perform a periodic process, the relay device being configured to, when receiving the instruction to perform the periodic process, perform the periodic process comprising:
  initially, in response to receipt of the instruction to perform the periodic process, receiving terminal information from the terminal device and transmitting the received terminal information to the terminal management device; and
  subsequently, each time a first interval set for the periodic process elapses, repeatedly receiving the terminal information from the terminal device and transmitting the received terminal information to the terminal management device, even without again receiving the instruction to perform the periodic process;
when the periodic process is performed by the relay device, receive the terminal information repeatedly transmitted by the relay device;
while the periodic process is performed by the relay device, transmit to the relay device a reply including an instruction to change the first interval to a second interval; and
after interval information stored in the relay device is updated according to the second interval, receive result information regarding a result of the change of the first interval from the relay device and then receive the terminal information from the relay device without waiting for the first interval to elapse, before the second interval for the periodic process is set.

5. The non-transitory computer-readable medium according to claim 4,
wherein the program instructions are further configured to, when executed, cause the terminal management device to:
  when receiving an instruction directed to the relay device or the terminal device from a communication device communicable with the terminal management device or through an input device capable of inputting information to the terminal management device, store the received instruction into a database; and
  when receiving from the relay device the inquiry for obtainment of the instruction directed to the relay device, transmit to the relay device the reply including the instruction stored in the database.

6. The non-transitory computer-readable medium according to claim 5,
wherein the program instructions are further configured to, when executed, cause the terminal management device to:
  when receiving from the relay device a request to delete the instruction stored in the database after transmitting to the relay device the reply including the instruction stored in the database, delete from the database the instruction requested to be deleted.

7. The non-transitory computer-readable medium according to claim 4,
wherein the terminal management device and the relay device are configured to communicate with each other through a firewall.

8. A relay device comprising:
a communication interface configured to communicate with a terminal management device and a terminal device, the terminal management device being communicable with the terminal device via the relay device; and
a controller configured to:
  transmit an inquiry for obtainment of an instruction directed to the relay device, to the terminal management device via the communication interface;
  perform a periodic process when receiving a reply including an instruction to perform the periodic process from the terminal management device via the communication interface, the periodic process comprising:
    initially, in response to receipt of the instruction to perform the periodic process, receiving terminal information from the terminal device and transmitting the received terminal information to the terminal management device; and
    subsequently, each time a first interval set for the periodic process elapses, repeatedly receiving the terminal information from the terminal device and transmitting the received terminal information to the terminal management device, even without again receiving the instruction to perform the periodic process; and
  when receiving a reply including an instruction to change the first interval to a second interval from the terminal management device via the communication interface, after updating interval information stored in the relay device according to the second interval, transmit result information regarding a result of the change of the first interval to the terminal management device and then transmit the terminal information to the terminal management device without waiting for the first interval to elapse, before setting the second interval for the periodic process.

9. The relay device according to claim 8,
wherein the controller comprises:
  a processor; and
  a memory storing computer-readable program instructions configured to, when executed by the processor, cause the controller to:
    transmit the inquiry for obtainment of an instruction directed to the relay device, to the terminal management device via the communication interface;
    perform the periodic process when receiving the reply including the instruction to perform the periodic process from the terminal management device via the communication interface; and
    when receiving the reply including the instruction to change the first interval to the second interval from the terminal management device via the communication interface, transmit the result information to the terminal management device and then transmit the terminal information to the terminal management device without waiting for the first interval to elapse, before setting the second interval for the periodic process.

10. A terminal management device comprising:
a communication interface configured to communicate with a relay device and communicate with a terminal device via the relay device; and
a controller configured to:
  when receiving from the relay device an inquiry for obtainment of an instruction directed to the relay device, transmit a reply including an instruction to perform a periodic process to the relay device via the communication interface, the relay device being configured to, when receiving the instruction to perform the periodic process, perform the periodic process comprising:

initially, in response to receipt of the instruction to perform the periodic process, receiving terminal information from the terminal device and transmitting the received terminal information to the terminal management device; and subsequently, each time a first interval set for the periodic process elapses, repeatedly receiving the terminal information from the terminal device and transmitting the received terminal information to the terminal management device, even without again receiving the instruction to perform the periodic process;

when the periodic process is performed by the relay device, receive via the communication interface the terminal information repeatedly transmitted by the relay device;

while the periodic process is performed by the relay device, transmit to the relay device a reply including an instruction to change the first interval to a second interval; and after interval information stored in the relay device is updated according to the second interval, receive result information regarding a result of the change of the first interval from the relay device and then receive the terminal information from the relay device without waiting for the first interval to elapse, before the second interval for the periodic process is set.

11. The terminal management device according to claim 10,
wherein the controller comprises:
 a processor; and
 a memory storing computer-readable program instructions configured to, when executed by the processor, cause the controller to:
  when receiving from the relay device the inquiry for obtainment of an instruction directed to the relay device, transmit the reply including the instruction to perform the periodic process to the relay device via the communication interface;
  when the periodic process is performed by the relay device, receive via the communication interface the terminal information repeatedly transmitted by the relay device;
  while the periodic process is performed by the relay device, transmit to the relay device the reply including the instruction to change the first interval to the second interval; and
  after interval information stored in the relay device is updated according to the second interval, receive the result information from the relay device and then receive the terminal information from the relay device without waiting for the first interval to elapse, before the second interval for the periodic process is set.

12. A system comprising:
a terminal device;
a terminal management device; and
a relay device comprising:
 a first communication interface configured to communicate with the terminal management device and the terminal device, the terminal management device being communicable with the terminal device via the relay device; and
 a first controller configured to:
  transmit an inquiry for obtainment of an instruction directed to the relay device, to the terminal management device via the first communication interface;
  perform a periodic process when receiving a reply including an instruction to perform the periodic process from the terminal management device via the first communication interface, the periodic process comprising:
   initially, in response to receipt of the instruction to perform the periodic process, receiving terminal information from the terminal device and transmitting the received terminal information to the terminal management device; and
   subsequently, each time a first interval set for the periodic process elapses, repeatedly receiving the terminal information from the terminal device and transmitting the received terminal information to the terminal management device, even without again receiving the instruction to perform the periodic process; and
  when receiving a reply including an instruction to change the first interval to a second interval from the terminal management device via the first communication interface, after updating interval information stored in the relay device according to the second interval, transmit result information regarding a result of the change of the first interval to the terminal management device and then transmit the terminal information to the terminal management device without waiting for the first interval to elapse, before setting the second interval for the periodic process,
wherein the terminal management device comprises:
 a second communication interface configured to communicate with the relay device and communicate with the terminal device via the relay device; and
 a second controller configured to:
  when receiving from the relay device an inquiry for obtainment of an instruction directed to the relay device, transmit a reply including at least one of the instruction to perform the periodic process and the instruction to change the first interval to the relay device via the second communication interface;
  when the periodic process is performed by the relay device, receive via the second communication interface the terminal information repeatedly transmitted by the relay;
  while the periodic process is performed by the relay device, transmit to the relay device the reply including the instruction to change the first interval to the second interval; and
  after the interval information stored in the relay device is updated according to the second interval, receive the result information regarding the result of the change of the first interval from the relay device and then receive the terminal information from the relay device without waiting for the first interval to elapse, before the second interval for the periodic process is set.

13. The system according to claim 12,
wherein the terminal management device and the relay device are configured to communicate with each other through a firewall.

* * * * *